US009274016B2

(12) United States Patent
Tokuda et al.

(10) Patent No.: US 9,274,016 B2
(45) Date of Patent: Mar. 1, 2016

(54) PRESSURE SENSOR CHIP

(71) Applicant: Azbil Corporation, Tokyo (JP)

(72) Inventors: Tomohisa Tokuda, Tokyo (JP); Yuuki Seto, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 117 days.

(21) Appl. No.: 14/085,253

(22) Filed: Nov. 20, 2013

(65) Prior Publication Data

US 2014/0157905 A1     Jun. 12, 2014

(30) Foreign Application Priority Data

Nov. 20, 2012 (JP) ................................ 2012-254726

(51) Int. Cl.
*G01L 13/02* (2006.01)
*G01L 1/22* (2006.01)
*G01L 9/00* (2006.01)

(52) U.S. Cl.
CPC ............. *G01L 13/025* (2013.01); *G01L 9/0051* (2013.01)

(58) Field of Classification Search
CPC .................................. G01L 1/22; G01L 13/02
USPC .......................................................... 73/715
See application file for complete search history.

(56) References Cited

U.S. PATENT DOCUMENTS

| 4,680,569 A | 7/1987 | Yamaki et al. |
| 5,126,813 A | 6/1992 | Takahashi et al. |
| 7,360,431 B2 | 4/2008 | Yoneda et al. |
| 9,021,885 B2 | 5/2015 | Seto et al. |
| 2006/0272422 A1* | 12/2006 | Yoneda et al. ................... 73/724 |
| 2012/0006129 A1* | 1/2012 | Tokuda et al. ............ 73/862.629 |

FOREIGN PATENT DOCUMENTS

| CN | 102374912 A | 3/2012 |
| CN | 103308241 A | 9/2013 |

(Continued)

OTHER PUBLICATIONS

Korean Office Action dated Sep. 29, 2014, which issued during prosecution of Korean Application No. 10-2013-0138147, which corresponds to the present application.

(Continued)

*Primary Examiner* — Lisa Caputo
*Assistant Examiner* — Jamel Williams
(74) *Attorney, Agent, or Firm* — Troutman Sanders LLP

(57) ABSTRACT

A pressure sensor chip includes a sensor diaphragm, and first and second retaining members. The first and second retaining members face and are bonded to peripheral edge portions of a first face and another face of the sensor diaphragm, and have pressure guiding holes that guide measurement pressures to the sensor diaphragm. The first retaining member has, in an interior thereof, a non-bonded region that is continuous with a peripheral portion of the pressure guiding hole. The non-bonded region in the interior of the first retaining member is provided at a portion of a plane that is parallel to a pressure bearing surface of the sensor diaphragm. The second retaining member is provided with a recessed portion that prevents excessive dislocation of the sensor diaphragm when an excessively large pressure is applied to the sensor diaphragm.

6 Claims, 12 Drawing Sheets

(56) References Cited

FOREIGN PATENT DOCUMENTS

| | | | |
|---|---|---|---|
| JP | H03-289528 A | 12/1991 | |
| JP | 2003-227769 | 8/2003 | |
| JP | 2003227769 A * | 8/2003 | ................ G01L 9/04 |
| JP | 2005-069736 A | 3/2005 | |
| JP | 2012-018049 | 1/2012 | |
| JP | 2012018049 A * | 1/2012 | |
| KR | 2012-0004923 | 1/2012 | |

OTHER PUBLICATIONS

Chinese Office Action dated Jun. 2, 2015, which issued during the prosecution of Chinese Patent Application No. 201310581798.9, which corresponds to the present application.

* cited by examiner

Background Art

Background Art

Background Art

PRESSURE SENSOR CHIP

CROSS REFERENCE TO RELATED APPLICATION

This application claims priority under 35 U.S.C. §119 to Japanese Patent Application No. 2012-254726, filed on Nov. 20, 2012, the entire content of which being hereby incorporated herein by reference.

FIELD OF TECHNOLOGY

The present invention relates to a pressure sensor chip that uses a sensor diaphragm that outputs a signal in accordance with a difference in pressures borne by one face and by another face thereof, for example, a pressure sensor chip wherein a strain resistance gauge is formed on a thin plate-shaped diaphragm that deforms when bearing pressure, to detect, from a change in the resistance value of a strain resistance gauge that is formed on the diaphragm, the pressure that is applied to the diaphragm.

BACKGROUND

Conventionally, differential pressure sensors that incorporate pressure sensor chips that use sensor diaphragms for outputting signals in accordance with differences between pressures borne on one face and borne on the other face have been used as differential pressure sensors for industrial use. These differential pressure sensors are structured so as to guide the respective measurement pressures, which will act on high-pressure-side and low-pressure-side pressure bearing diaphragms, to one side face and the other side face of a sensor diaphragm, through a filling liquid as a pressure transmitting medium, so as to detect the deformation of the sensor diaphragm as, for example, a change in a resistance value of a strain resistance gauge, to convert this change in the resistance value into an electric signal, so as to be outputted to the outside.

This type of differential pressure sensor is used when measuring, for example, a liquid surface height through detecting a pressure difference between two locations, upper and lower, within a sealed tank for storing a fluid that is to be measured, such as a high-temperature reaction tower in an oil refining plant.

FIG. 10 is illustrates a schematic structure for a conventional differential pressure sensor. This differential pressure sensor 100 is structured through incorporating, in a meter body 2, a pressure sensor chip 1 having a sensor diaphragm (not shown). The sensor diaphragm in the pressure sensor chip 1 is made from silicon, glass, or the like, and a strain resistance gauge is formed on a surface of the diaphragm, which is formed in a thin plate shape. The meter body 2 is structured from a main unit portion 3, made out of metal, and a sensor portion 4, where a pair of barrier diaphragms (pressure bearing diaphragms) 5a and 5b, which are pressure bearing portions, is provided on a side face of the main unit portion 3, and the pressure sensor chip 1 is incorporated in the sensor portion 4.

In the meter body 2, the pressure sensor chip 1 that is incorporated in the sensor portion 4 is connected to the barrier diaphragms 5a and 5b that are provided in the main unit portion 3 through respective pressure buffering chambers 7a and 7b, which are separated by a large-diameter center diaphragm 6, and pressure transmitting media 9a and 9b, such as silicone oil, or the like, are filled into connecting ducts 8a and 8b, which connect the pressure sensor chip 1 to the barrier diaphragms 5a and 5b.

Note that the pressure transmitting medium, such as the silicone oil, is required because it is necessary to separate the strain (pressure)-sensitive sensor diaphragm from the corrosion-resistant pressure bearing diaphragms, in order to prevent foreign materials within the measurement medium from becoming adhered to the sensor diaphragm, and to prevent corrosion of the sensor diaphragm.

In this differential pressure sensor 100, a first fluid pressure (first measurement pressure) Pa from a process is applied to the barrier diaphragm 5a, and a second fluid pressure (second measurement pressure) Pb, from the process, is applied to the barrier diaphragm 5b, as in the operating state during proper operation that is illustrated schematically in FIG. 11(a). As a result, the barrier diaphragms 5a and 5b undergo dislocation, and the pressures Pa and Pb that are applied thereto are directed to the first face and the other face of the sensor diaphragm of the pressure sensor chip 1, by the pressure transmitting media 9a and 9b, through pressure buffering chambers 7a and 7b that are divided by the center diaphragm 6. The result is that the sensor diaphragm of the pressure sensor chip 1 undergoes dislocation in accordance with the pressure differential ΔP between the pressures Pa and Pb that are directed thereto.

In contrast, if, for example, an excessively large pressure Pover is applied to the barrier diaphragm 5a, then, as illustrated in FIG. 11(b), the barrier diaphragm 5a undergoes a large dislocation, and the center diaphragm 6 undergoes dislocation in accordance therewith so as to absorb the excessively large pressure Pover. Given this, the barrier diaphragm 5a bottoms out on the bottom face (an excessive pressure guard face) of a recessed portion 10a of the meter body 2, controlling the dislocation thereof, and preventing the propagation of a greater differential pressure ΔP than that to the sensor diaphragm through the barrier diaphragm 5a. When an excessively large pressure Pover is applied to the barrier diaphragm 5b as well, as with the case wherein an excessively large pressure Pover is applied to the barrier diaphragm 5a, the barrier diaphragm 5b bottoms out on the bottom face (an excessive pressure guard face) of a recessed portion 10b of the meter body 2, controlling the dislocation thereof, and preventing the propagation of a greater differential pressure ΔP than that to the sensor diaphragm through the barrier diaphragm 5b. The result is that breakage of the pressure sensor chip 1, that is, breakage of the sensor diaphragm in the pressure sensor chip 1, due to the application of an excessively large pressure Pover is prevented in advance.

In this differential pressure sensor 100, the pressure sensor chip 1 is enclosed within the meter body 2, thus making it possible to protect the pressure sensor chip 1 from the outside corrosive environment, such as the process fluid. However, because the structure is one wherein the center diaphragm 6 and the recessed portions 10a and 10b are provided for controlling the dislocation of the barrier diaphragms 5a and 5b to protect the pressure sensor chip 1 from excessively large pressures Pover thereby, the dimensions thereof unavoidably must be increased.

Given this, there has been a proposal for a structure for preventing breakage/rupture of the sensor diaphragm through preventing excessive dislocation of the sensor diaphragm, when an excessively large pressure is applied, through the provision of a first stopper member and a second stopper member, and having recessed portions of the first stopper member and the second stopper member face the one face side and the other face side of the sensor diaphragm. See, for example, Japanese Unexamined Patent Application Publication No. 2005-69736 ("the JP '736").

FIG. 12 illustrates schematically a pressure sensor chip that uses the structure illustrated in the JP '736. In this figure, 11-1 is a sensor diaphragm, 11-2 and 11-3 are first and second stopper members that are bonded with the sensor diaphragm 11-1 interposed therebetween, and 11-4 and 11-5 are first and second pedestals to which the stopper members 11-2 and 11-3 are bonded. The stopper members 11-2 and 11-3 and the pedestals 11-4 and 11-5 are structured from silicon, glass, or the like.

In this pressure sensor chip 11, recessed portions 11-2a and 11-3a are formed in the stopper members 11-2 and 11-3, where the recessed portion 11-2a of the stopper member 11-2 faces the one face of the sensor diaphragm 11-1, and the recessed portion 11-3a of the stopper member 11-3 faces the other face of the sensor diaphragm 11-1. The recessed portions 11-2a and 11-3a have surfaces that are curved along the dislocation of the sensor diaphragm 11-1, where pressure guiding holes 11-2b and 11-3b are formed at the apex portions thereof. Pressure introducing holes 11-4a and 11-5a are formed in the pedestals 11-4 and 11-5 as well, at positions corresponding to those of the pressure guiding holes 11-2b and 11-3b of the stopper members 11-2 and 11-3.

When such a pressure sensor chip 11 is used, then when there is a displacement of the sensor diaphragm 11-1 when an excessively large pressure is applied to the one face of the sensor diaphragm 11-1, the entirety of the dislocated face is supported and stopped by the curved surface of the recessed portion 11-3a of the stopper member 11-3. Moreover, then when there is a displacement of the sensor diaphragm 11-1 when an excessively large pressure is applied to the other face of the sensor diaphragm 11-1, the entirety of the dislocated face is supported and stopped by the curved surface of the recessed portion 11-2a of the stopper member 11-2.

This effectively prevents accidental rupturing of the sensor diaphragm 11-1 due to the application of an excessively large pressure, through preventing excessive dislocation when an excessively large pressure is applied to the sensor diaphragm 11-1, by preventing a concentration of stresses on the peripheral edge portion of the sensor diaphragm 11-1, thus enabling an increase in the excessively large pressure guard operating pressure (withstand pressure). Moreover, in the structure illustrated in FIG. 10, the center diaphragm 6 and the pressure buffering chambers 7a and 7b are eliminated, and the measurement pressures Pa and Pb are guided directly from the barrier diaphragms 5a and 5b the sensor diaphragm 11-1, thus making it possible to achieve a reduction in the size of the meter body 2.

However, in the structure of the pressure sensor chip 11 illustrated in FIG. 12, the entirety of the faces of the peripheral edge portions 11-2c and 11-3c of the stopper members 11-2 and 11-3 are bonded to the one face and the other face of the sensor diaphragm 11-1. That is, the peripheral edge portion 11-2c that surrounds the recessed portion 11-2a of the stopper member 11-2 faces one face of the sensor diaphragm 11-1, and the entire region of this oppositely-facing peripheral edge portion 11-2c is bonded directly to the one face of the sensor diaphragm 11-1. Moreover, the peripheral edge portion 11-3c that surrounds the recessed portion 11-3a of the stopper member 11-3 faces the other face of the sensor diaphragm 11-1, and the entire region of this oppositely-facing peripheral edge portion 11-3c is bonded directly to the other face of the sensor diaphragm 11-1.

With this structure, when an excessively large pressure that exceeds the excessively large pressure guarding operation pressure (the withstand pressure) by the stopper member 11-2 is applied, then after the sensor diaphragm 11-1 flexes to arrive at the bottom of the recessed portion 11-2a of the stopper member 11-2, in this state the sensor diaphragm 11-1 further flexes along with the stopper member 11-2. Given this, there is a problem that the vicinity of the edge (the position surrounded by the dotted line in FIG. 12) of the sensor diaphragm 11-1 on the side to which the pressure is applied, where the greatest tensile stress is produced, will be in a constrained state on both sides, thus causing a concentration of stress at that location, making it impossible to secure the expected withstand pressure.

Furthermore, when there is a mismatch, in manufacturing, in the opening sizes of the recessed portions 11-2a and 11-3a of the stopper members 11-2 and 11-3, there will be misalignment of the locations of constraints on the sensor diaphragm 11-1, with the effect thereof sometimes causing more pronounced concentration of stresses. In this case, the concentration of stresses is much more severe following the sensor diaphragm 11-1 arriving at the bottom, presenting the risk of a further reduction in withstand pressure.

The present invention was created in order to solve such a problem, and an aspect thereof is to provide a pressure sensor chip able to secure the expected withstand pressure by reducing the stresses due to constraints on the diaphragm, to prevent the concentration of stresses at the diaphragm edges.

SUMMARY

The present invention, in order to achieve the aspect set forth above, has a pressure sensor chip including a sensor diaphragm that outputs a signal in accordance with a difference in pressures applied to a first face and to another face, and first and second retaining members, which face and are bonded to the peripheral edge portions of the first face and the other face of the sensor diaphragm, having pressure guiding holes that guide measurement pressures to the sensor diaphragm. The first retaining member has, in the interior thereof, a non-bonded region that is continuous with the peripheral portion of the pressure guiding hole. The non-bonded region in the interior of the first retaining member is provided at a portion of a plane that is parallel to a pressure bearing surface of the sensor diaphragm. The second retaining member is provided with a recessed portion that prevents excessive dislocation of the sensor diaphragm when an excessively large pressure is applied to the sensor diaphragm.

In the present invention, when a high-pressure measurement pressure is applied to the one face of the sensor diaphragm, the sensor diaphragm flexes to the second retaining member side which tends to cause the occurrence of cracking in the diaphragm edge. In this case, in the present invention the measurement pressure is guided through a pressure guiding hole to the non-bonded region that is provided on the interior of the first retaining member, and thus the non-bonded region becomes the pressure bearing surface for the measurement pressure, so the first bearing member flexes to deform following the same direction of the second pressure bearing member and the diaphragm, so that cracks do not appear in the diaphragm edges. Doing so enables a reduction in the stress that is produced due to the constraint on the sensor diaphragm, preventing the concentration of stresses in the diaphragm.

Moreover, in the present invention, the withstand pressure can be made even higher through forming a ring-shaped groove in the interior portion of the first retaining member protruding in the direction of the wall thickness of the first retaining member, and which is continuous with the non-bonded region, causing the stress on the interior of the ring-shaped groove that is continuous with the non-bonded region to be diffused.

In the present invention, when the face of the sensor diaphragm that will bear the high-pressure-side measurement pressure is determined reliably, then the one face of the sensor diaphragm is used as the pressure bearing surface for the high-pressure-side measurement pressure, and the other face is used as the pressure bearing face for the low-pressure-side measurement pressure. That is, when the face of the sensor diaphragm that will bear the high-pressure-side measurement pressure is determined reliably, then the one face of the sensor diaphragm is used as the pressure bearing surface for the high-pressure-side measurement pressure, and the high-pressure-side measurement pressure is introduced through a pressure guiding hole to a non-bonded region within the first retaining member.

In the present invention, the first retaining member may also be provided with a recessed portion for preventing excessive dislocation of the sensor diaphragm when an excessively large pressure is applied to the sensor diaphragm, and for the second retaining member as well, as with the first retaining member, a non-bonded region may be provided in the interior thereof. Doing this makes it possible to prevent the concentration of stresses on the diaphragm edges, through reducing the production of stresses due to constraints on the sensor diaphragm, so as not to produce cracking in the diaphragm edges, regardless of which face of the sensor diaphragm is used as the pressure bearing surface for the high-pressure-side measurement pressure.

In the present invention, the non-bonded region within the first retaining member need only be a region that is not bonded, where the surfaces may or may not be in contact with each other. For example, surfaces may be roughened through plasma or a chemical solution to form a region wherein, although the surfaces may contact each other, they do not bonded to each other. Moreover, it may also be formed with a fine step.

In the present invention, a non-bonded region that is continuous with a peripheral portion of a pressure guiding hole is provided in the interior of a first retaining member, and this non-bonded region on the interior of the first retaining member is provided at a portion of a plane that is parallel to the pressure bearing surface of the sensor diaphragm, and thus the non-bonded region on the interior of the first retaining member serves as a pressure bearing surface, to suppress forces in the opposite direction that are applied to the first retaining member, so that cracking is not produced in the diaphragm edges, making it possible to secure the anticipated withstand pressure by preventing concentration of stresses in the diaphragm edges, by reducing the occurrence of stresses due to constraints on the sensor diaphragm.

BRIEF DESCRIPTIONS OF THE DRAWINGS

DETAILED DESCRIPTION

Examples according to the present invention will be explained below in detail, based on the drawings.

Example

Figure 1:
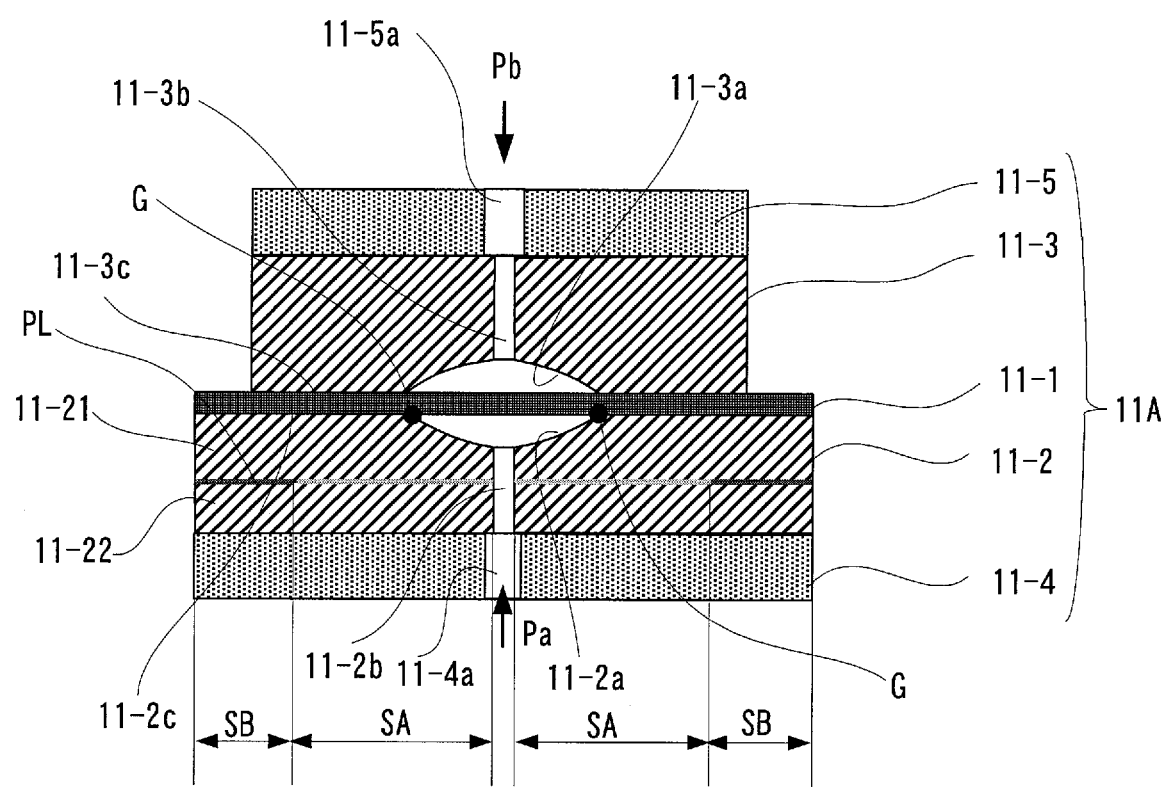
FIG. 1 is a diagram illustrating schematically Example of a pressure sensor chip according to the present invention.
Figure 11:
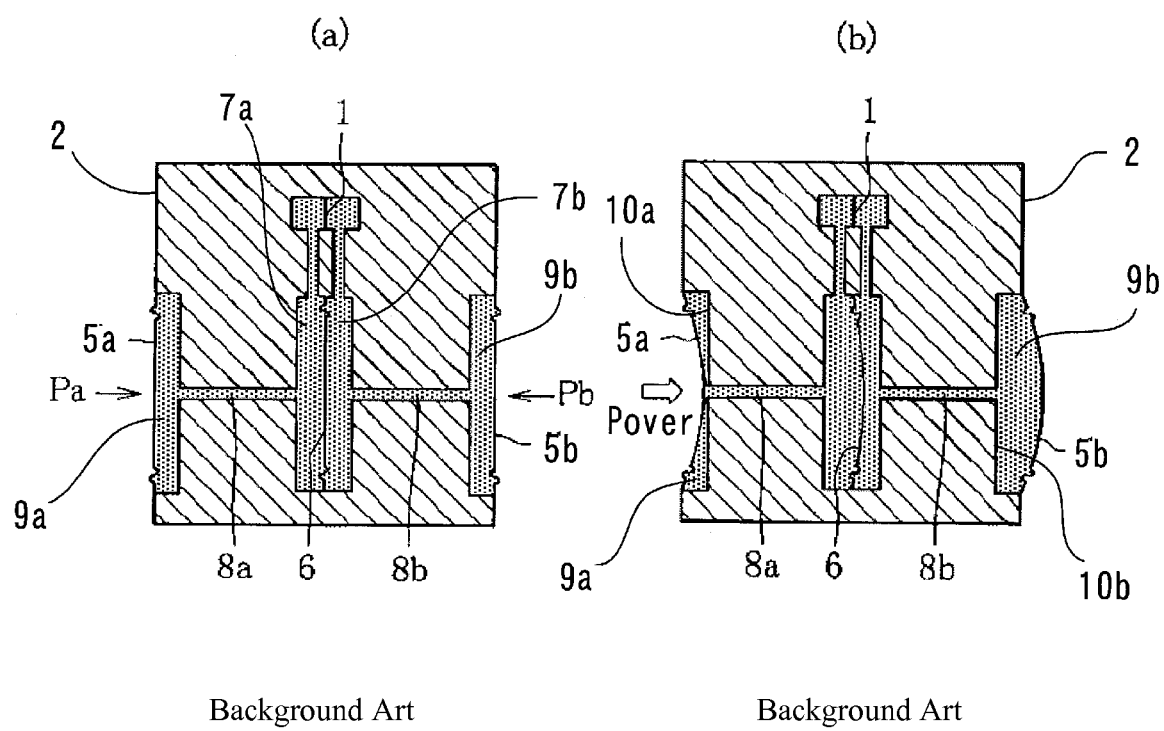
FIG. 11 is a diagram illustrating schematically a state of operation of the conventional differential pressure sensor.
Figure 12:
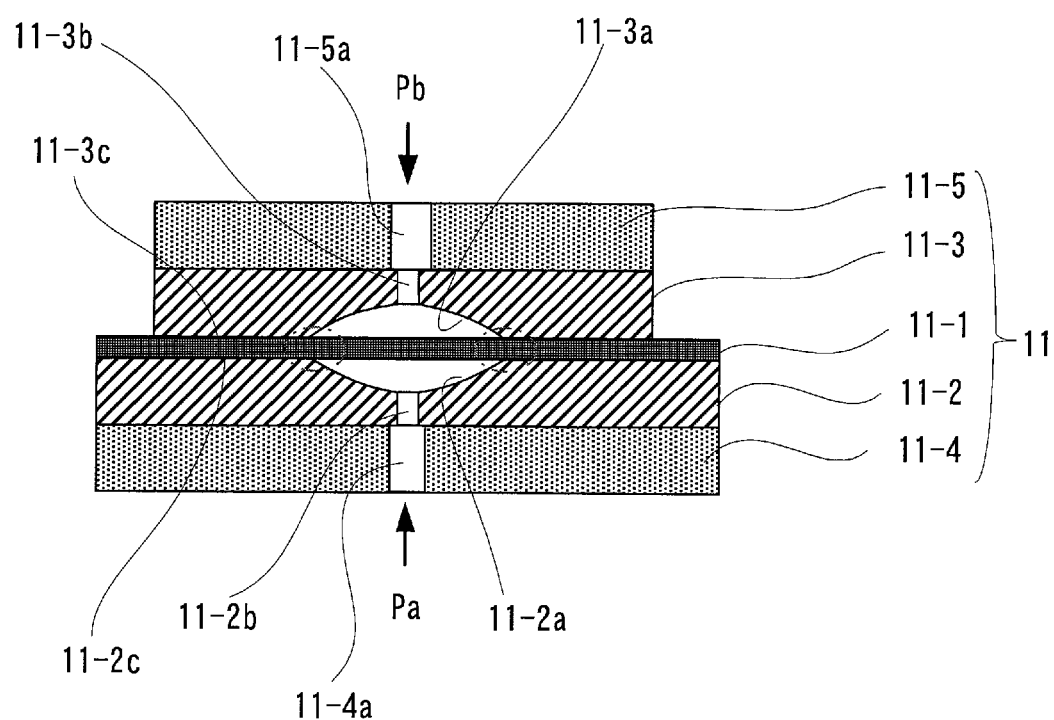
FIG. 12 is a diagram illustrating schematically a pressure sensor chip that uses the structure illustrated in the JP '736.

FIG. 1 is a diagram illustrating schematically Example of a pressure sensor chip according to the present invention. In this figure, codes that are the same as those in FIG. 12 indicate identical or equivalent structural elements as the structural elements explained in reference to FIG. 12, and explanations thereof are omitted. Note that, in this example, the pressure sensor chip is indicated by the code 11A, to differentiate from the pressure sensor chip 12 illustrated in FIG. 11.

In this pressure sensor chip 11A, the stopper member 11-2 has a non-bonded region SA, which connects to the peripheral portion of the pressure guiding hole 11-2$b$, in the interior thereof. The non-bonded region SA is provided at a portion of a plane PL that is parallel to the pressure bearing surface of the sensor diaphragm 11-1. The non-bonded region SA is formed as a region wherein the faces contact each other, but are not bonded, through roughening the surfaces through a plasma, a chemical solution, or the like.

In this example, the stopper member 11-2 is divided in two by a plane PL that is parallel to the pressure bearing surface of the sensor diaphragm 11-1, where the one stopper member 11-21 and the other stopper member 11-22, divided in two in this way, form a single stopper member 11-2, through being bonded together in the region SB, excluding the non-bonded region SA of the plane PL wherein the non-bonded region SA is provided. In this way, the plane PL that is parallel to the pressure bearing surface of the sensor diaphragm 11-1 is divided into the non-bonded region SA, which is continuous with the peripheral portion of the pressure guiding hole 11-2$b$, and the bonded region SB, which is not continuous with the peripheral portion of the pressure guiding hole 11-2$b$.

In this pressure sensor chip 11A, when the measurement pressure Pa is used as the high-pressure-side measurement pressure and the measurement pressure Pb is used as the low-pressure-side measurement pressure, then when the high-pressure-side measurement pressure Pa is applied to the one face of the sensor diaphragm 11-1, the sensor diaphragm 11-1 flexes to the stopper member 11-3 side. At this time, a force is applied to the stopper member 11-2 on the opposite side from the direction in which the sensor diaphragm 11-1 flexes, which tends to produce cracking in the diaphragm edges (the location indicated by the dot G in the figure). Note that, in the explanation below, in FIG. 1 the direction in which the sensor diaphragm 11-1 flexes is termed the upward direction, and the side opposite from the direction of flexure is termed the downward direction.

In this case, in the present example, the measurement pressure Pa is guided through the pressure guiding hole 11-2b to the non-bonded region SA that is provided in the interior of the stopper member 11-2, and thus the non-bonded region SA serves as the pressure bearing surface for the measurement pressure Pa, suppressing the force in the downward direction that is applied to the stopper member 11-2, so that cracking is not occur in the diaphragm edges. Doing so enables a reduction in the stress that is produced due to the constraint on the sensor diaphragm 11-1, preventing the concentration of stresses in the diaphragm edges.

In the pressure sensor chip 11A, if the excessively large pressure becomes larger after the sensor diaphragm 11-1 has arrived at the bottom of the recessed portion 11-3a of the stopper member 11-3, the effects of the non-bonded region SA will be manifested even more greatly.

Figure 2:
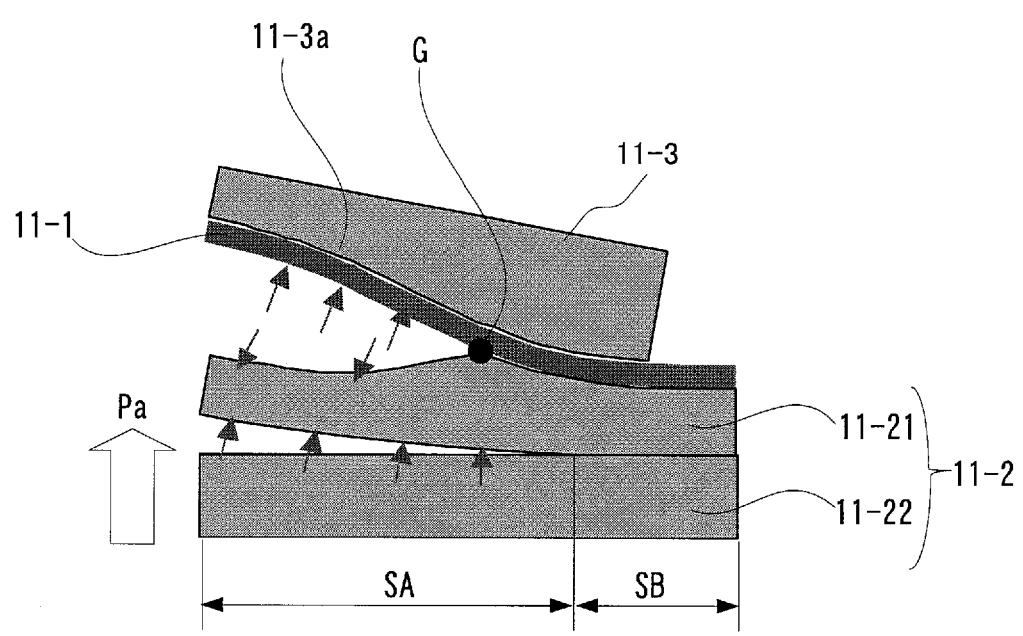
FIG. 2 is a diagram illustrating the state after the sensor diaphragm has reached the bottom of the recessed portion of the stopper member in the Example of this pressure sensor chip.

FIG. 2 shows the status after the sensor diaphragm 11-1 has arrived at the bottom of the recessed portion 11-3a of the stopper member 11-3. When an excessively large pressure is applied to the one face side of the sensor diaphragm 11-1, the sensor diaphragm 11-1 flexes to the stopper member 11-3 side, and arrives at the bottom of the recessed portion 11-3a of the stopper member 11-3. If the excessively large pressure becomes larger after the sensor diaphragm 11-1 has arrived at the bottom of the recessed portion 11-3a, then the stopper member 11-2 will deform due to the force in the downward direction that is applied to the stopper member 11-2, which will tend to cause cracking in the diaphragm edges.

In this case, in the present example, the excessively large pressure is guided also through the pressure guiding hole 11-2b to the non-bonded region SA that is provided in the inner portion of the stopper member 11-2, causing this non-bonded region SA to become the pressure bearing surface for the excessively large pressure, to apply a force in the upward direction on the stopper member 11-21, suppressing deformation of the stopper member 11-21, or causing the deformation in the opposite direction. In the case in FIG. 2, the stopper member 11-21 deforms in the upward direction in a shape that follows the deformation of the diaphragm 11-1 in the upward direction.

As a result, even if the excessively large pressure becomes larger after the arrival of the sensor diaphragm 11-1 at the bottom of the recessed portion 11-3a of the stopper member 11-3, cracks will not be produced in the diaphragm edges, but rather the concentration of stresses in the diaphragm edges is avoided, and the anticipated withstand pressure is ensured.

Note that in the present example, the area of the non-bonded region SA that is provided in the interior of the stopper member 11-2, that is, the pressure bearing surface area of the interior of the stopper member 11-2, preferably is an area that is adequately larger than the pressure bearing surface area of the recessed portion 11-2a of the stopper member 11-2, in order to suppress deformation of the stopper member 11-2 in the downward direction or to cause deformation in the opposite direction.

Figure 3:
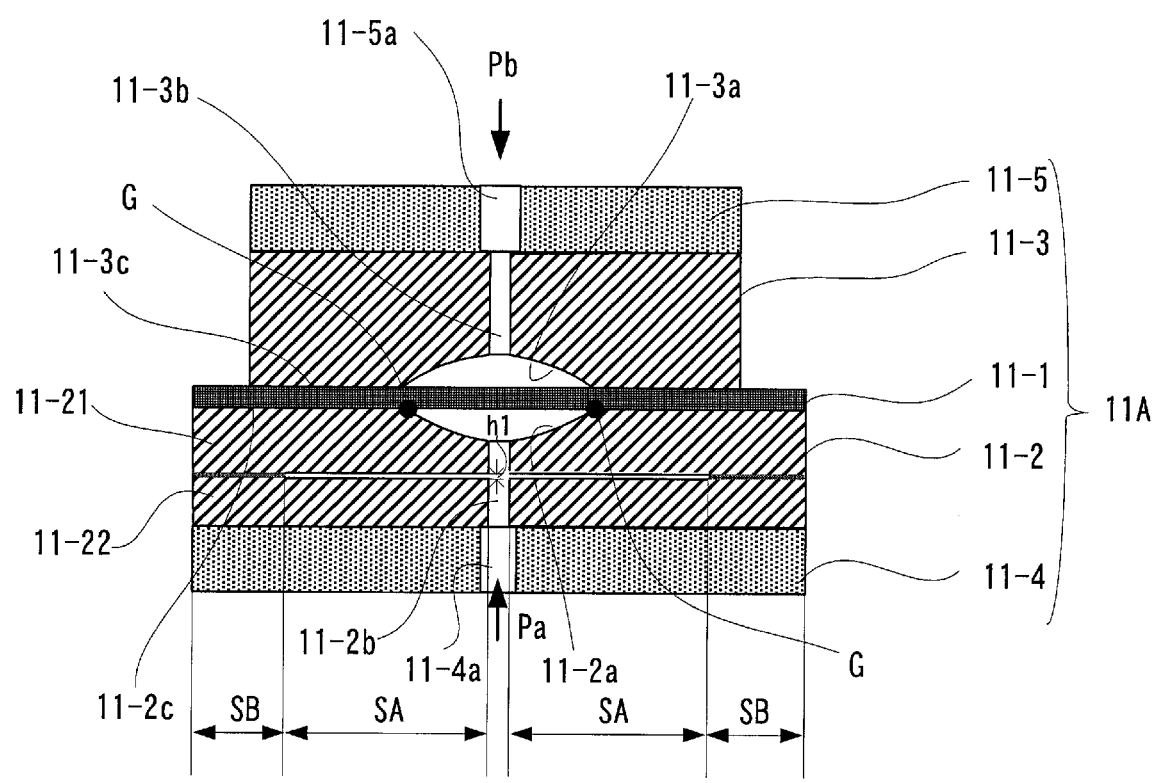
FIG. 3 is a diagram illustrating an example of forming the non-bonded region as a fine step in the stopper member in the pressure sensor chip.

Moreover, while in the present example the non-bonded region SA in the interior of the stopper member 11-2 was formed through, for example, roughening the surfaces through plasma, a chemical solution, or the like, instead, as illustrated in FIG. 3, it may be formed as a fine step h1. When formed as a fine step h1, then if the dimension of the step h1 is too large, this would cause weakness to forces in the upward direction, and thus the step h1 should be small. The dimension of the step h1 is dependent on the force directed in the downward direction of the stopper member 11-2.

Another Example

Figure 4:
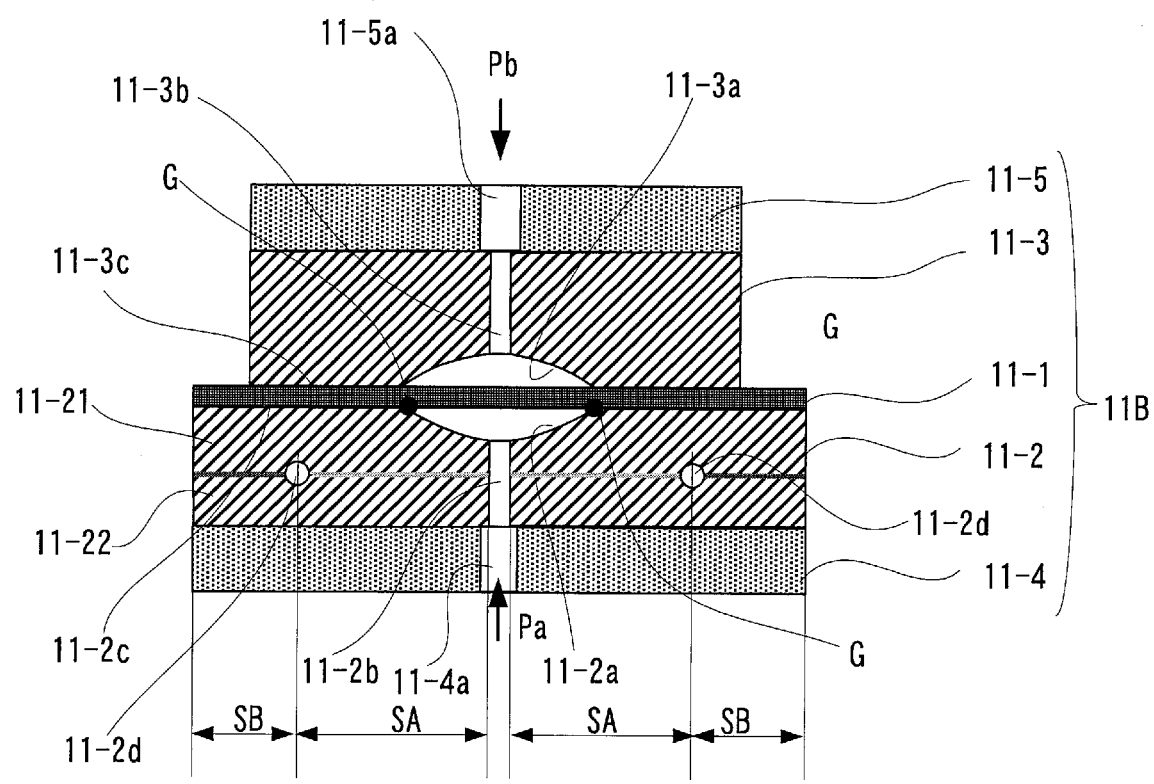
FIG. 4 is a diagram illustrating schematically Another Example of a pressure sensor chip according to the present invention.

FIG. 4 illustrates schematically Another Example of a pressure sensor chip according to the present invention. In the pressure sensor chip 11B according to the Another Example, a ring-shaped groove 11-2d that protrudes in the wall thickness direction of the stopper member 11-3 that is continuous with the non-bonded region SA is formed in the interior of the stopper member 11-2. This ring-shaped groove 11-2d is not a groove that is broken up discontinuously, but rather is a continuous groove, and preferably the radius of the cross-section of the groove is large.

Figure 5:
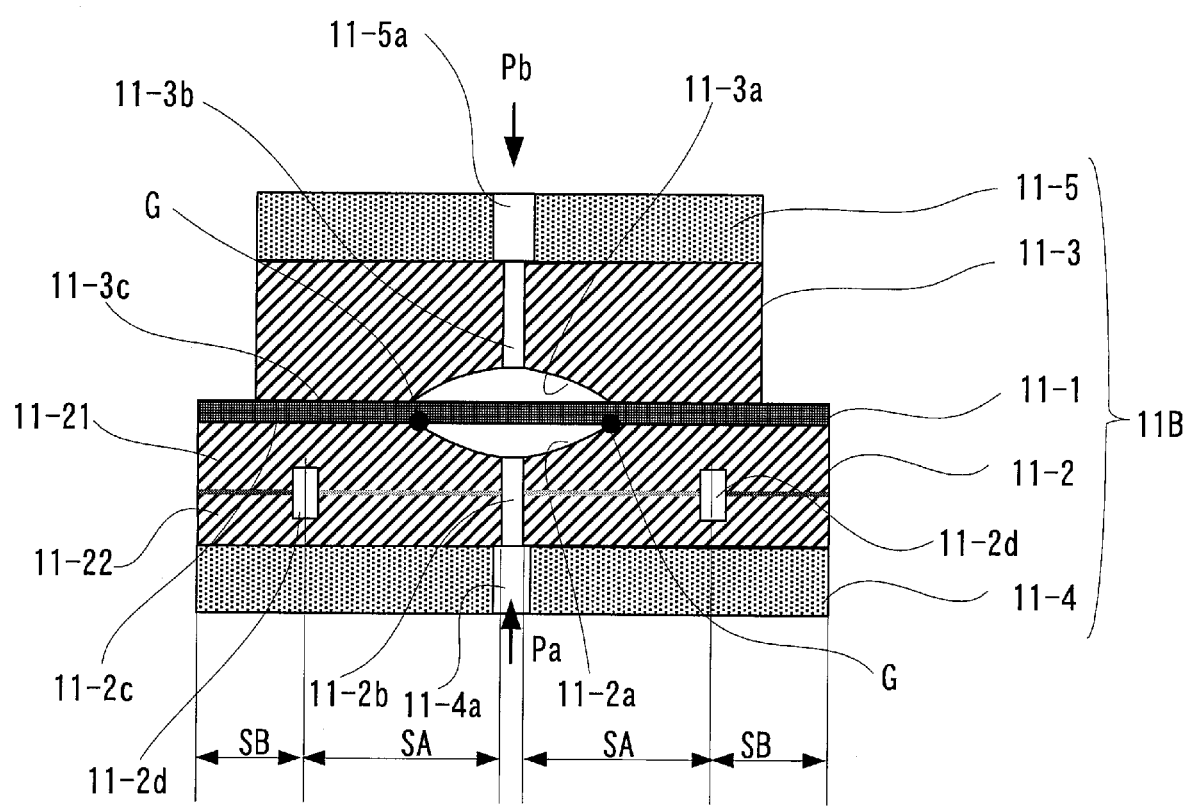
FIG. 5 is a diagram illustrating an example of the ring-shaped groove in the interior of the stopper member being a slit-shaped (a rectangular cross-sectional surface) ring-shaped groove, in this pressure sensor chip.
Figure 6:
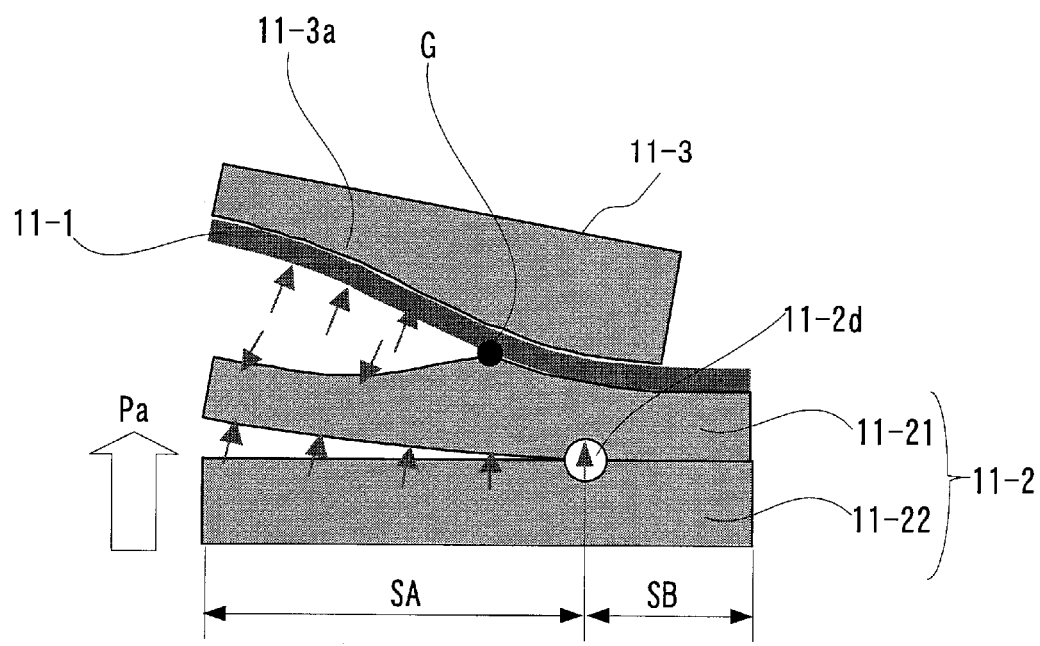
FIG. 6 is a diagram illustrating the state after the sensor diaphragm has reached the bottom of the recessed portion of the stopper member in the Another Example of this pressure sensor chip.

Note that while in the example illustrated in FIG. 4 the cross-sectional shape of the intersection of the ring-shaped groove 11-2d with the non-bonded region SA was circular, it need not necessarily be circular, but rather may have a slit shape (rectangular shape), as illustrated in FIG. 5. FIG. 6 illustrates the state after the sensor diaphragm 11-1 has arrived at the bottom of the recessed portion 11-3a of the stopper member 11-3 in the pressure sensor chip 11B.

Yet Another Example

Figure 7:
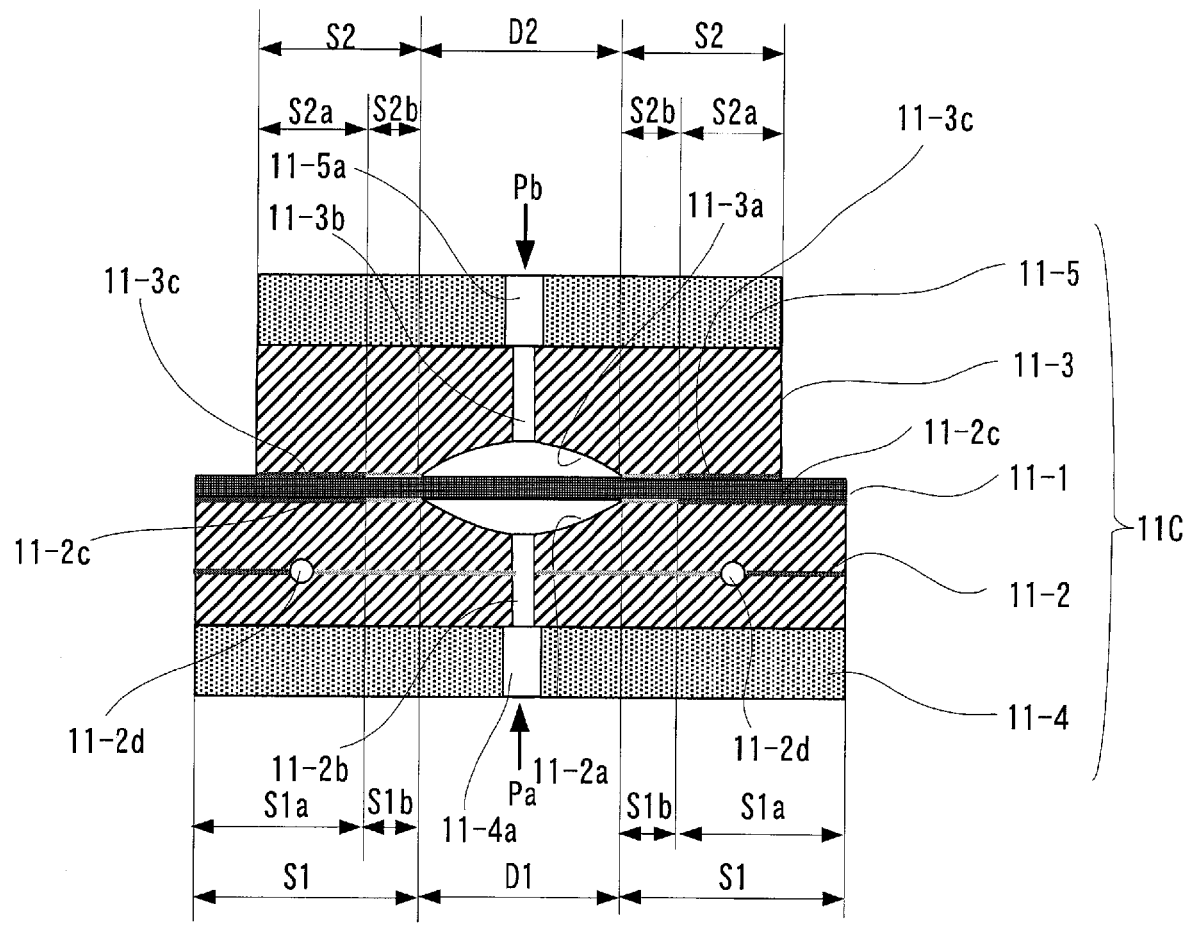
FIG. 7 is a diagram illustrating schematically Yet Another Example of a pressure sensor chip according to the present invention.

FIG. 7 illustrates schematically Yet Another Example of a pressure sensor chip according to the present invention. As with the pressure sensor chip 11B of the Another Example, the pressure sensor chip 11C of the Yet Another Example has a non-bonded region SA in the interior of the stopper member 11-2, and a ring-shaped groove 11-2d that is continuous with the non-bonded region SA; however, it is different from the pressure sensor chip 11B of the Another Example in the points set forth below.

In the pressure sensor chip 11C, the peripheral edge portion 11-2c of the stopper member 11-2 has, in the region S1 that faces the one face of the sensor diaphragm 11-1, an outer peripheral side region S1a that is a bonded region, bonded to the one face of the sensor diaphragm 11-1, and an inner peripheral side region S1b, that is a non-bonded region, not bonded to the one face side of the sensor diaphragm 11-1.

Moreover, the peripheral edge portion 11-3c of the stopper member 11-3 has, in the region S2 that faces the other face of the sensor diaphragm 11-1, an outer peripheral side region S2a that is a bonded region, bonded to the other face of the sensor diaphragm 11-1, and an inner peripheral side region S2b, that is a non-bonded region, not bonded to the other face side of the sensor diaphragm 11-1.

The outer peripheral side region S1a of the peripheral edge portion 11-2c of the stopper member 11-2 is made into a bonded region through being bonded directly to the one face side of the sensor diaphragm 11-1, and the outer peripheral side region S2a of the peripheral edge portion 11-3c of the stopper member 11-3 is made into a bonded region through being bonded directly to the other face side of the sensor diaphragm 11-1.

The region S1b on the inner peripheral side of the peripheral edge portion 11-2c of the stopper member 11-2 has the surface roughened, or the like, through plasma or a chemical solution, or the like, so that it will be a non-bonded region that will not bond even if it contacts the one face side of the sensor diaphragm 11-1. The region S2b on the inner peripheral side of the peripheral edge portion 11-3c of the stopper member 11-3 has the surface roughened, or the like, through plasma or a chemical solution, or the like, so that it will be a non-bonded region that will not bond even if it contacts the other face side of the sensor diaphragm 11-1.

In this pressure sensor chip 11C, the region further toward the inside from the non-bonded region S1b on the bottom face of the sensor diaphragm 11-1 is used as the pressure sensitive region D1 of the diaphragm, and similarly, the region further toward the inside from the non-bonded region S2b on the top face of the sensor diaphragm 11-1 is used as the pressure sensitive region D2 of the diaphragm. One measurement pressure Pa is applied to the face that faces the stopper member 11-2 in the pressure sensitive region D1 of the diaphragm, and the other measurement pressure Pb is applied to the face that faces the stopper member 11-3 in the pressure sensitive region D2 of the diaphragm. Note that the diameter of the pressure sensitive regions D1 and D2 is the effective diameter of the diaphragm.

In pressure sensor chip 11C, if the measurement pressure Pa is the high-pressure-side measurement pressure and the measurement pressure Pb is the low-pressure-side measurement pressure, then when the high-pressure-side measurement pressure Pa is applied to the pressure sensitive region D1 on the bottom face of the sensor diaphragm 11-1, the sensor diaphragm 11-1 can flex without the production of an excessive tensile stress, due to the constraint from the stopper member 11-2, at the non-bonded region S1b that is not bonded to the peripheral edge portion 11-2c of the stopper member 11-2, thus reducing the stress that is produced in this part.

Moreover, in pressure sensor chip 11C, if the measurement pressure Pb is the high-pressure-side measurement pressure and the measurement pressure Pa is the low-pressure-side measurement pressure, then when the high-pressure-side measurement pressure Pb is applied to the pressure sensitive region D2 on the top face of the sensor diaphragm 11-1, the sensor diaphragm 11-1 can flex without the production of an excessive tensile stress, due to the constraint from the stopper member 11-3, at the non-bonded region S2b that is not bonded to the peripheral edge portion 11-3c of the stopper member 11-3, thus reducing the stress that is produced in this part.

Figure 8:
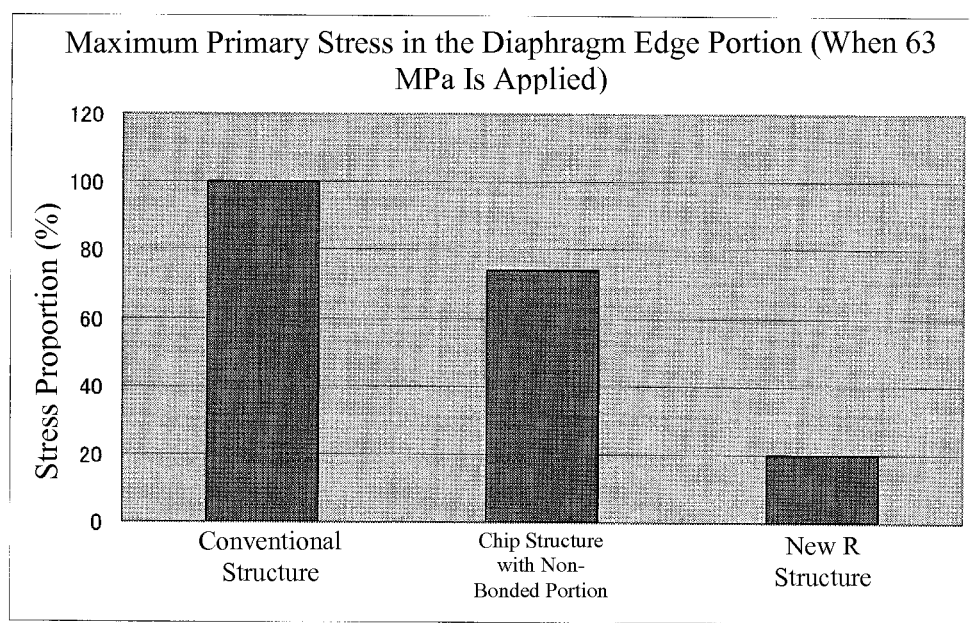
FIG. 8 is a diagram illustrating the proportions of stress produced at the diaphragm edges, comparing individual structures with the case of the conventional structure being defined as 100%.

FIG. 8 shows the proportions of stress produced in the diaphragm edges, comparing the structure with the non-bonded portion (the structure illustrated in FIG. 1) and a new R structure (the structure illustrated in FIG. 7), with the case of the conventional structure (the structure illustrated in FIG. 12) defined as 100%. As can be understood from the result of the comparison, the stresses produced in the diaphragm edges are mitigated through having a non-bonded portion, or through the new R structure. With the new R structure, the proportion of generated stress, relative to the conventional structure, is small, at about 20%, and thus the result is particularly good.

Figure 9:
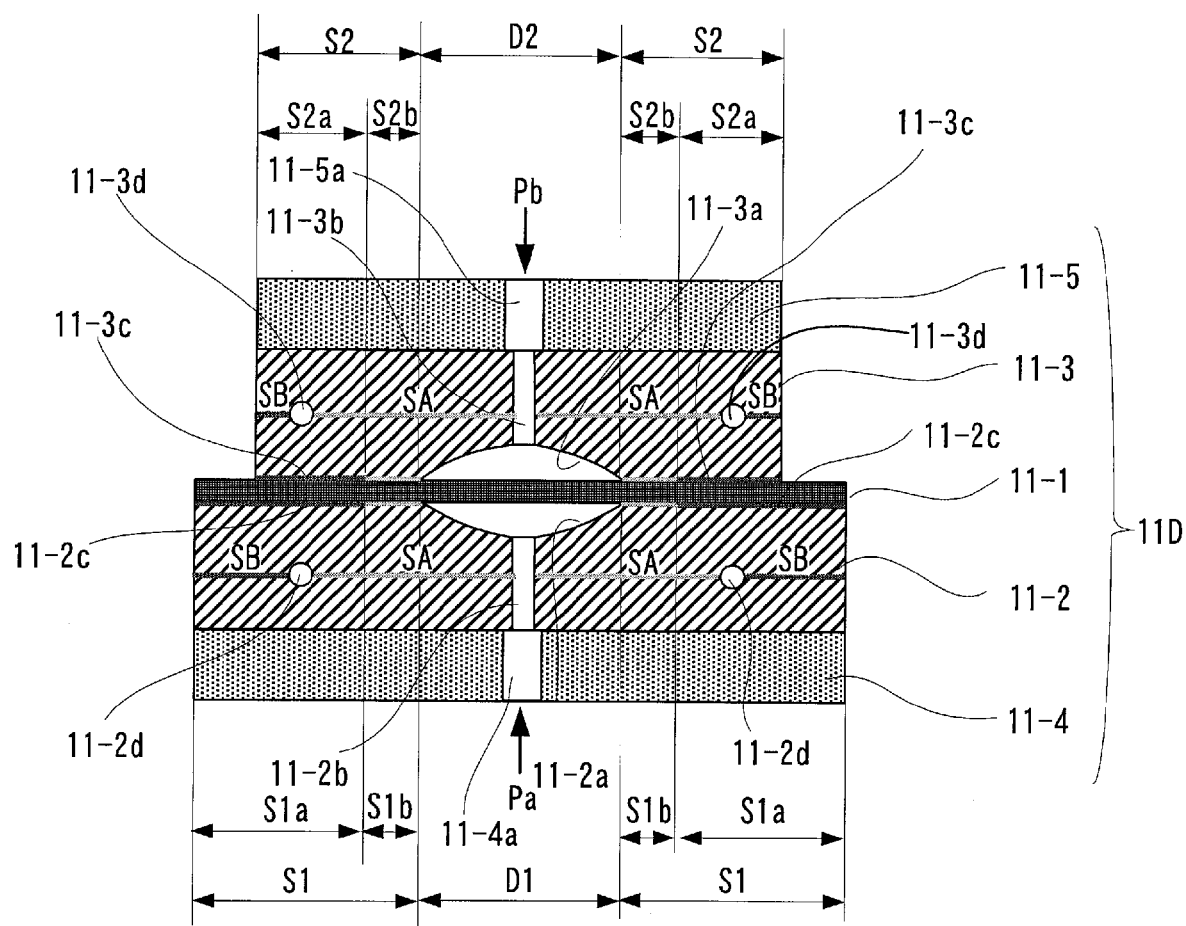
FIG. 9 is a diagram illustrating schematically Further Example of a pressure sensor chip according to the present invention.
Figure 10:
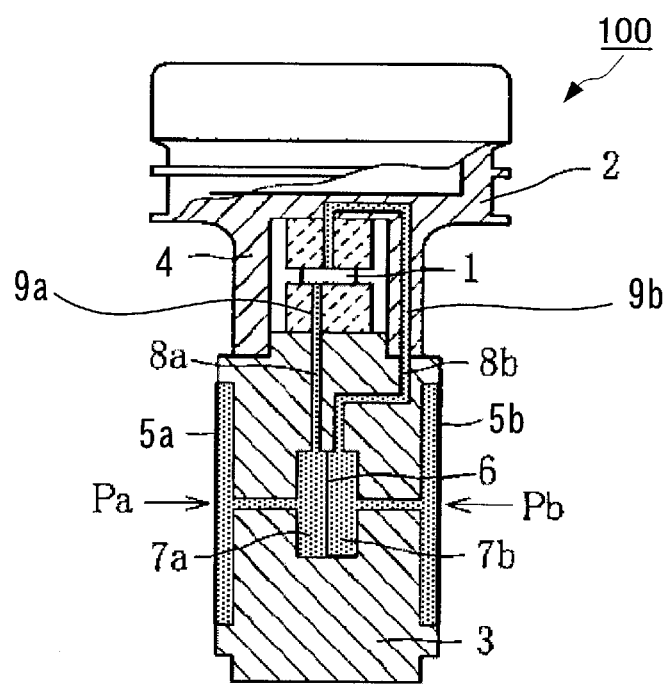
FIG. 10 is a diagram illustrating a schematic structure of a conventional differential pressure sensor.

Note that while in the example illustrated in FIG. 7 the non-bonded region SA is provided only in the interior of the stopper member 11-2, instead, as illustrated as a pressure sensor chip 11D of Further Example in FIG. 9, a non-bonded region SA may be provided also in the interior of the stopper member 11-3, and a ring-shaped groove 11-3d that is continuous with the non-bonded region SA may be provided.

While in the pressure sensor chip 11D of the Further Example, the ring-shaped groove 11-2d that is provided in the interior of the stopper member 11-2 and the ring-shaped groove 11-3d that is provided in the interior of the stopper member 11-3 have identical cross-sectional shapes, and are provided facing the same position, instead the ring-shaped grooves 11-2d and 11-3d may have different cross-sectional shapes, and the positions of the ring-shaped grooves 11-2d and 11-3d in the crosswise direction may also be different. Moreover, the cross-sectional shapes of the ring-shaped grooves 11-2d and 11-3d are not limited to the circular or slit shapes described above, but rather various different shapes, such as an elliptical shape, may be considered.

Moreover, while in the Example, Another Example, Yet Another Example and Further Example, described above, recessed portions 11-2a and 11-3a were provided in the stopper members 11-2 and 11-3, the recessed portions 11-2a and 11-3a need not necessarily be provided, but instead retaining member may be a simple retaining member that merely retains the sensor diaphragm 11-1. In this case as well, the non-bonded region that is provided within the retaining member acts as a pressure bearing surface for applying a force to the opposite side from the direction in which the sensor diaphragm 11-1 flexes.

Moreover, while in the examples set forth above the sensor diaphragm 11-1 was of a type wherein a strain resistance gauge was formed wherein there is a change in resistance value in accordance with the change in pressure, the sensor chip may be of an electrostatic capacitance type instead. An electrostatic capacitance sensor chip has a substrate that is provided with a specific space (a capacitance chamber), a diaphragm that is provided on the space of the substrate, a stationary electrode that is formed on the substrate, and a movable electrode that is formed on the diaphragm. When the diaphragm deforms due to the application of pressure, the distance between the movable electrode and the stationary electrode changes, causing a change in the electrostatic capacitance over that space.

Extended Examples

While the present invention has been explained above in reference to examples, the present invention is not limited to the examples set forth above. The structures and details in the present invention may be varied in a variety of ways, as can be understood by one skilled in the art, within the scope of technology in the present invention. Moreover, the present invention may be embodied through combining the various examples, insofar as there are no contradictions.

The invention claimed is:

1. A pressure sensor chip comprising:
    a sensor diaphragm that outputs a signal in accordance with a difference in pressures applied to a first face and to another face; and
    first and second retaining members, which face and are bonded to the peripheral edge portions of the first face and the other face of the sensor diaphragm, wherein:
    the first retaining member has a first pressure guiding hole that guides a first measurement pressure to the first face of the sensor diaphragm,
    the second retaining member has a second pressure guiding hole that guides a second measurement pressure to the other face of the sensor diaphragm,
    the first retaining member has, in an interior thereof, a first non-bonded region that is continuous with a peripheral portion of the first pressure guiding hole;
    the first non-bonded region in the interior of the first retaining member is provided at a portion of a plane that is parallel to a pressure bearing surface of the sensor diaphragm; and the second retaining member is provided with a recessed portion that prevents excessive dislocation of the sensor diaphragm when an excessively large pressure is applied to the sensor diaphragm.

2. The pressure sensor chip as set forth in claim 1, wherein:
in the interior of the first retaining member, a ring-shaped groove is formed protruding in the direction of the wall thickness of the first retaining member, continuous with the non-bonded region.

3. The pressure sensor chip as set forth in claim 1, wherein:
the first retaining member is divided in two at the plane that is parallel to the pressure bearing surface of the sensor diaphragm, at which the non-bonded region is provided, where one retaining member and the other retaining member that are divided in two are bonded together, except for at the non-bonded region of the plane wherein the non-bonded region is provided.

4. The pressure sensor chip as set forth in claim 2, wherein:
in the ring-shaped groove that is continuous with the non-bonded region on the interior of the first retaining member, the cross-sectional shape of the intersection with the non-bonded region in the interior of the first retaining member includes a circular arc part.

5. The pressure sensor chip as set forth in claim 1, wherein:
the sensor diaphragm uses the one face as a pressure bearing face for a high-pressure-side measurement pressure, and uses the other face as the pressure bearing face for a low-pressure-side measurement pressure.

6. The pressure sensor chip as set forth in claim 1, wherein:
the first retaining member is provided with a recessed portion that prevents excessive dislocation of the sensor diaphragm when an excessively large pressure is applied to the sensor diaphragm;
the second retaining member has, in the interior thereof, a second non-bonded region that is continuous with the peripheral portion of the second pressure guiding hole; and
the second non-bonded region in the interior of the second retaining member is provided at a portion of a plane that is parallel to a pressure bearing surface of the sensor diaphragm.

* * * * *